(12) United States Patent
Sym

(10) Patent No.: US 10,015,648 B2
(45) Date of Patent: *Jul. 3, 2018

(54) COMPUTERIZED SYSTEM AND METHOD FOR RATING WIRELESS ROAMING

(71) Applicant: BILLING SERVICES GROUP, San Antonio, TX (US)

(72) Inventor: Michael Sym, Austin, TX (US)

(73) Assignee: BSG WIRELESS LIMITED, Aldermaston, Berkshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/083,682

(22) Filed: Mar. 29, 2016

(65) Prior Publication Data
US 2016/0286372 A1 Sep. 29, 2016

Related U.S. Application Data

(63) Continuation of application No. 14/067,334, filed on Oct. 30, 2013, now Pat. No. 9,326,118.

(60) Provisional application No. 61/791,785, filed on Mar. 15, 2013.

(51) Int. Cl.
| | |
|---|---|
| H04W 4/24 | (2018.01) |
| H04M 15/00 | (2006.01) |
| H04L 12/14 | (2006.01) |

(52) U.S. Cl.
CPC .......... *H04W 4/24* (2013.01); *H04L 12/1407* (2013.01); *H04L 12/1446* (2013.01); *H04M 15/8038* (2013.01)

(58) Field of Classification Search
None
See application file for complete search history.

(56) References Cited

U.S. PATENT DOCUMENTS

| | | | |
|---|---|---|---|
| 6,829,473 B2* | 12/2004 | Raman | G06Q 20/28 |
| | | | 455/406 |
| 7,890,082 B1 | 2/2011 | Keramane | |
| 2009/0029673 A1 | 1/2009 | Hamadi et al. | |
| 2010/0041365 A1 | 2/2010 | Lott et al. | |

(Continued)

OTHER PUBLICATIONS

Wireless Broadband Alliance; WRIX Standard Service Specification, Interconnect Definition; Dec. 17, 2009; 30 pages; Version 01.04.

(Continued)

*Primary Examiner* — Hilina K Demeter
(74) *Attorney, Agent, or Firm* — Winston & Strawn LLP

(57) ABSTRACT

Disclosed is a system and method for wireless data clearing and settlement. The disclosed systems and methods relate towards near real-time ratings for purposes of wireless rating for data clearing and financial settlement. The present disclosure reconciles differing rating attribute formats using flexible matching. The disclosed systems and methods apply known negotiated rates for Home Service Provider (HSP) users roaming onto a VNP hotspot, and apply a standardized set of attributes of the contract with the applicable HSP, and other attributes applying a different set of rates to another HSP. The present disclosure provides systems and methods that enable traffic to be offloaded more easily from the Wide Area Networks (WAN) or macro networks.

18 Claims, 13 Drawing Sheets

(56) References Cited

U.S. PATENT DOCUMENTS

| | | | |
|---|---|---|---|
| 2011/0130118 A1* | 6/2011 | Fan | H04M 15/00 |
| | | | 455/411 |
| 2013/0072126 A1* | 3/2013 | Topaltzas | H04W 24/08 |
| | | | 455/67.11 |
| 2015/0119068 A1* | 4/2015 | Kudekar | H04W 4/043 |
| | | | 455/456.1 |

OTHER PUBLICATIONS

B. Anton et al.; Best Current Practices for Wireless Internet Service Provider (WISP) Roaming; Wi-Fi Alliance; Feb. 2003; 37 pages; Version 1.0.

* cited by examiner

COMPUTERIZED SYSTEM AND METHOD FOR RATING WIRELESS ROAMING

CROSS-REFERENCE TO RELATED APPLICATIONS

This application is a continuation of, and claims priority from U.S. patent application Ser. No. 14/067,334, now U.S. Pat. No. 9,326,118, filed on Oct. 30, 2013, which claims the benefit of priority from U.S. Provisional Patent Application No. 61/791,785, filed Mar. 15, 2013, entitled "System And Method For Rating, Clearing And Settlement Of Wireless Roaming And Offloading," which are each incorporated herein by reference.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

TECHNICAL FIELD

The present disclosure relates in general to the field of wireless data clearing and settlement, and more particularly, to a system and method for near real-time rating for purposes of wireless rating for data clearing and financial settlement. The rating system supports a wide variety of rating scenarios, including location, time, minutes of use, data volume, incremental rating and directory management.

STATEMENT OF FEDERALLY FUNDED RESEARCH

None.

BACKGROUND

Generally, mobile devices can utilize the increasing number of access points (also known as WiFi hotspots) of WiFi networks and transport Internet traffic over WiFi networks in order to offload traffic, such as Internet traffic, from Wide Area Networks (WANs).

SUMMARY

The present disclosure addresses failings in the art by providing a system and method for customizing and flexibly rating data roaming and offloading user sessions for settlement and clearing purposes. That is, the present disclosure applies known negotiated rates for HSP users roaming onto a VNP hotspot, applies a standardized set of attributes of the contract with the applicable HSP, and other attributes applying a different set of rates to another HSP. Thus, in order to offload traffic to the WiFi networks, it is important that mobile devices be able to connect to legacy WiFi hotspots (i.e. access points which have no capability for the Extension Authentication Protocol (EAP)) in an efficient and optimized manner to ensure accountability and flexibility (to the user and network(s)), and with a minimum or no configuration from the user. This will enable traffic to be offloaded more easily from the Wide Area Networks (WAN) or macro networks, such as UMTS, GSM, GPRS, long-term evolution (LTE) or Wimax networks, to WiFi networks.

Generally, the present disclosure provides for differentiating partners and networks routed either directly through a settlement systems provider or through other hubs or aggregators. Specific code assignments track the roaming relationships at a variety of levels. The present disclosure further allows for sessions to be rated as accounting stops are received from VNPs, and both inbound and outbound usage is rated and available, thus allowing for near real-time rating and analysis. The data is then available for providing different rates for different hotspots, or groups of hotspots, based on a variety of data associated with the user session: data usage, minutes of use, session, domestic/international, hotspot name, venue type, usage caps per user, session clusters, tiers, specificity rounding options for MOU and data calculations, specificity for currency calculations.

Indeed, the present disclosure provides improves the capacity of all operator consumers affected by the congestion. The preferred embodiments of the disclosure realize an instance of a broker machine that reacts on information from wide area network management systems and holistically & cost efficiently manages the congestion problem. The management happens by selecting the most suitable local area operator and initiating the formation of a virtual device concept, e.g., nodes connected based on Network on Terminal Architecture (NoTA), between the selected mobile devices and a server attached with the selected local area network. The selection of the most suitable local area operator can happen based on location information, existing pricing contracts between the wide and local are operators or in an on-line auction, as discussed in more detail below.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF THE DISCLOSURE

Figure 1:
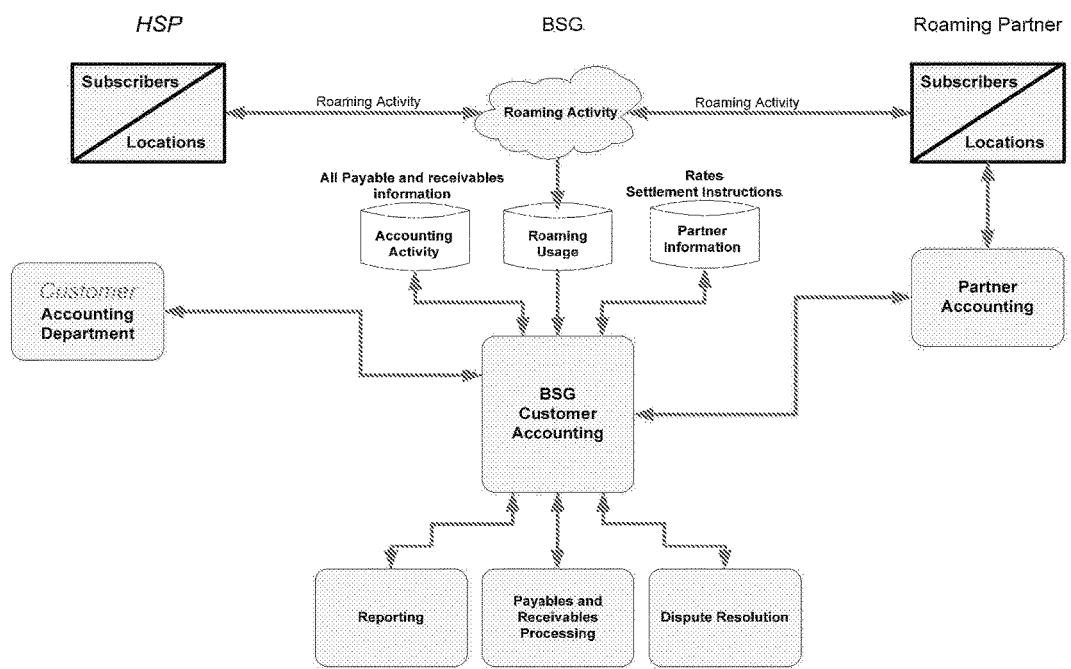
FIG. 1 depicts a general financial settlement system overview for purposes of reconciling and processing inbound and outbound payment and billing.
Figure 2:
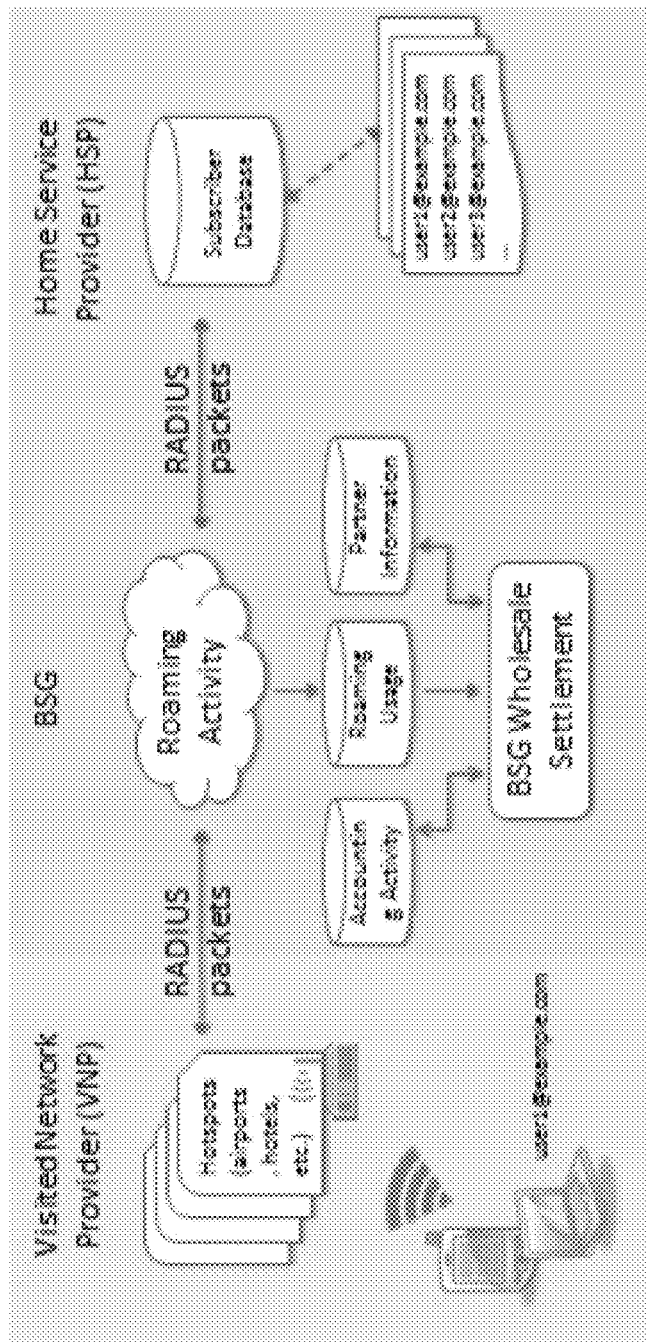
FIG. 2 depicts how Wi-Fi roaming occurs when subscribers from a Home Service Provider (HSP) roam onto a Visited Network Provider's (VNP) hotspot. Wholesale settlement is the act of identifying this traffic (user sessions), applying the negotiated rates, and facilitating the payment the HSP makes to the VNP for the network usage.
Figure 3:
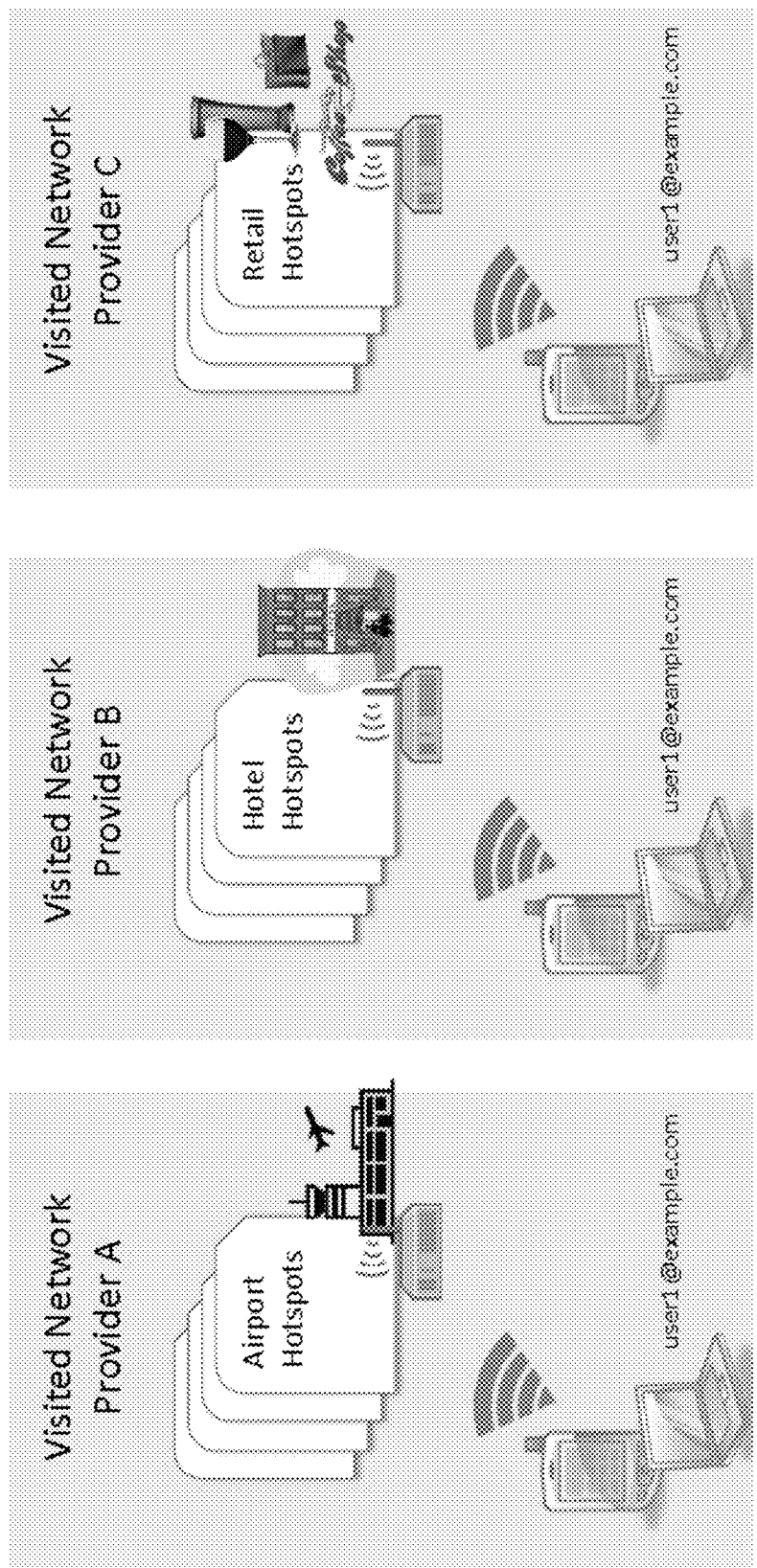
FIG. 3 depicts a typical problematic scenario wherein VNPs need the flexibility to charge different rates for different hotspots, or groups of hotspots, based on a variety of data (hotspot name, country, venue type, etc.).
Figure 4:
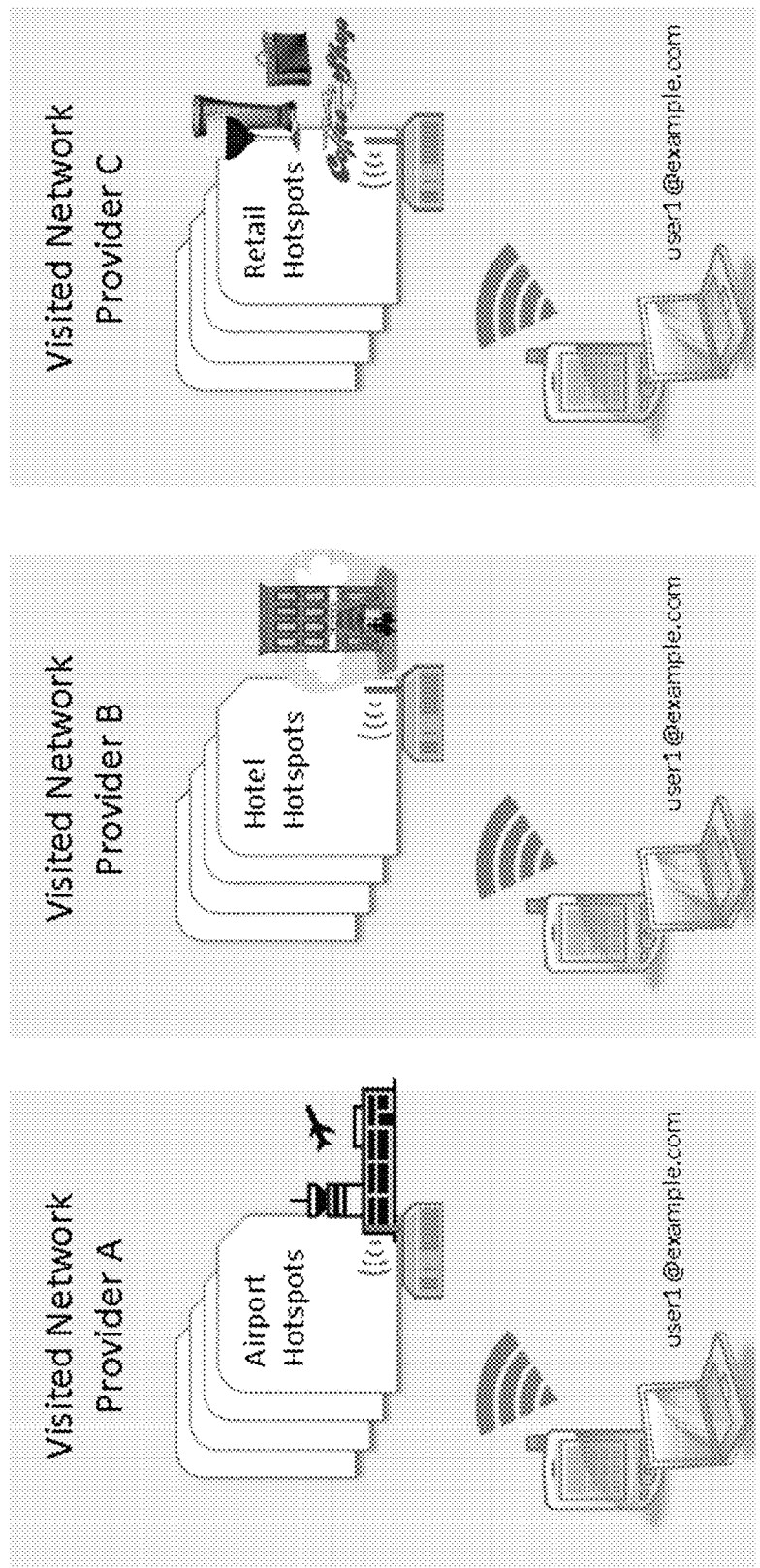
FIG. 4 shows another problematic scenario wherein a VNP A may use one set of RADIUS attributes with one particular format, while VNP B may use different RADIUS attributes and/or formats. VNP C might not convey this data in RADIUS at all, but instead rely on associating usage to its own Hotspot Directory.
Figure 5:
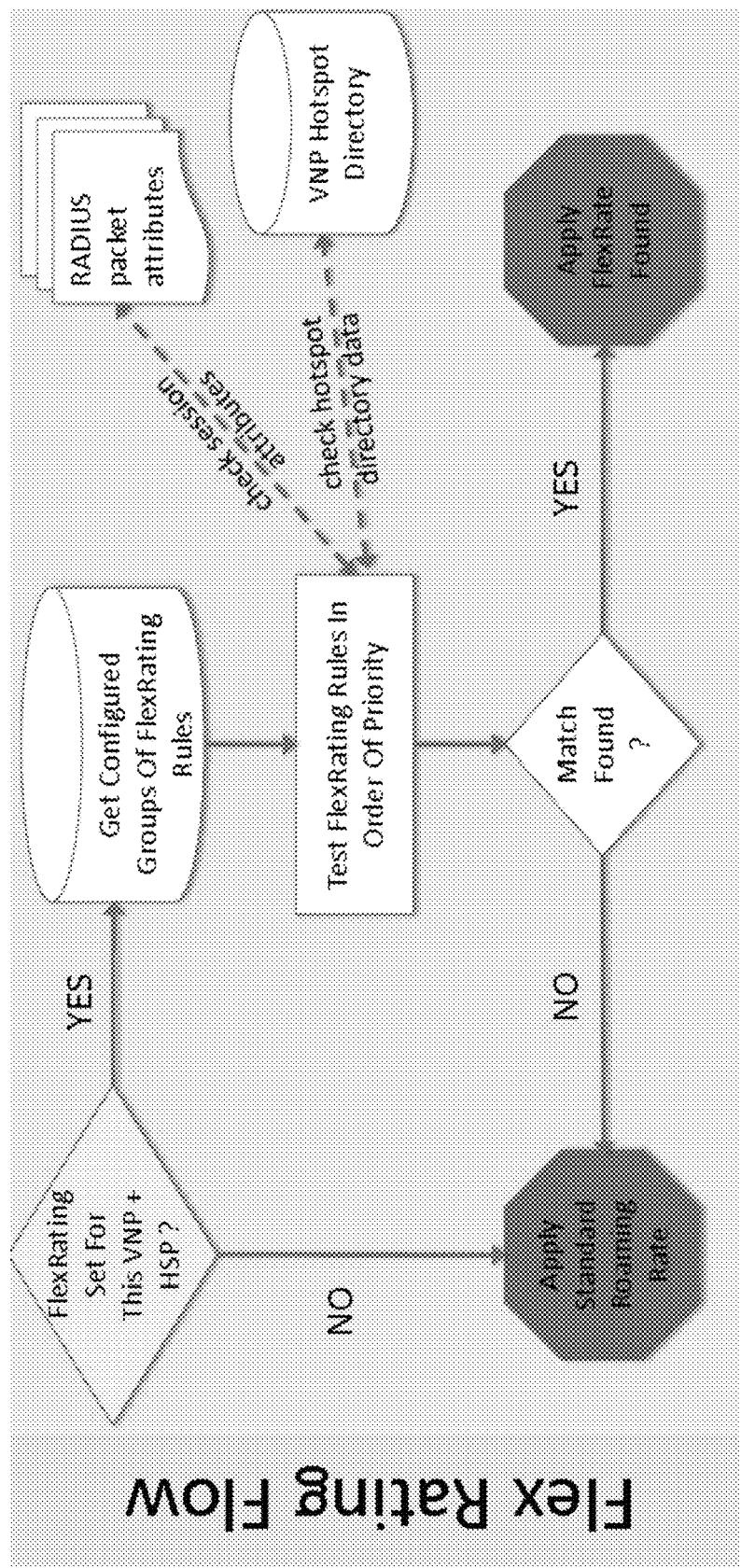
FIG. 5 depicts how the present disclosure allows a VNP to negotiate roaming contracts and define different rates for different hotspots. A VNP can assign one set of rates for a contract with one HSP, and a different set of rates on a different contract with another HSP.
Figure 6:
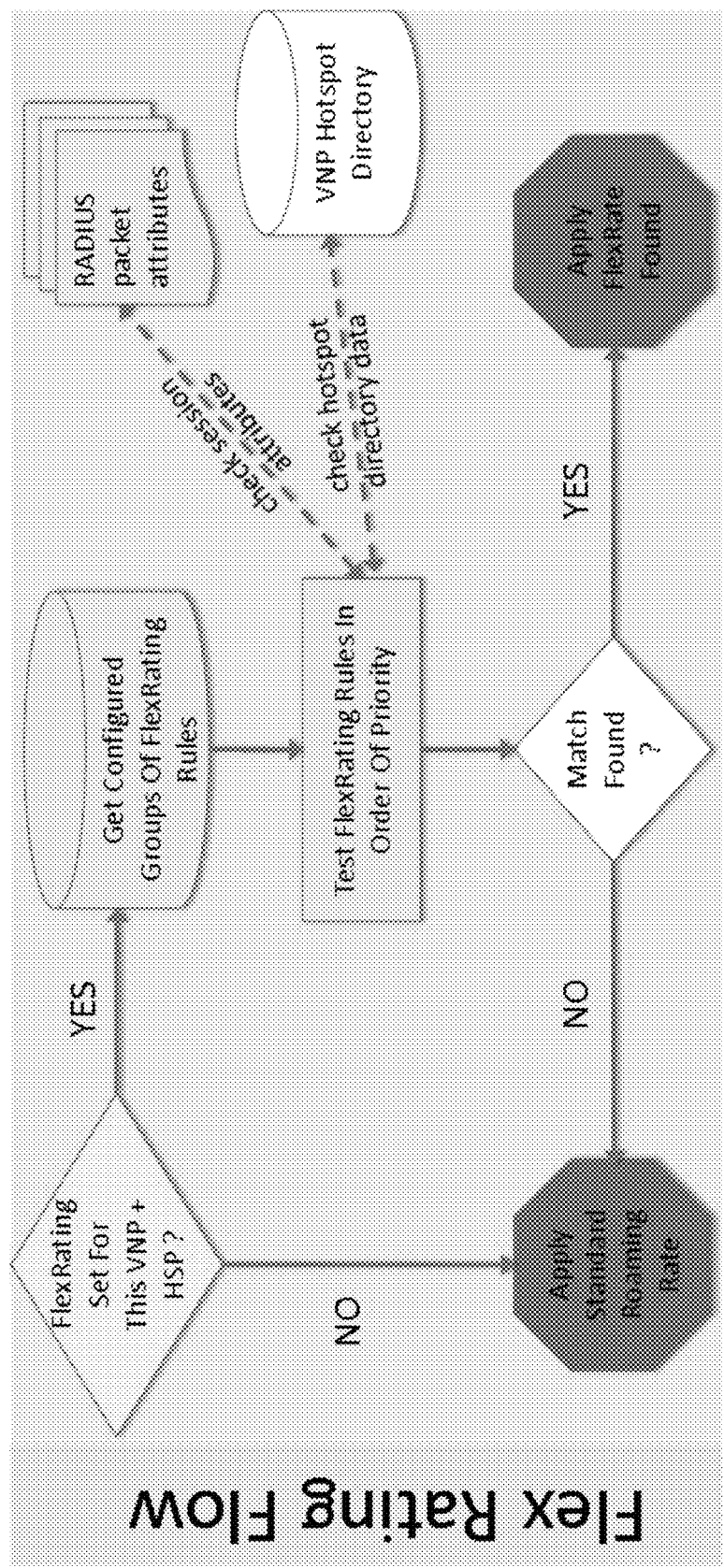
FIG. 6 depicts how the present disclosure uses groups of rules/conditions to test for a successful rating match. These rules are defined by matching a session's RADIUS attributes—AND/OR—its Hotspot Directory information against a defined regular expression, to allow for flexible string matching.

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the disclosure and do not delimit the scope of the disclosure.

All publications and patent applications mentioned in the specification are indicative of the level of skill of those skilled in the art to which this disclosure pertains. All publications and patent applications are herein incorporated by reference to the same extent as if each individual publication or patent application was specifically and individually indicated to be incorporated by reference.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a computer readable medium (or computer-readable storage medium/media)

stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

The present disclosure provides systems and methods for flexible rating, settlement and clearing of wireless data roaming and offloading for purposes of financial settlement and reconciliation.

Data traffic on mobile networks has increased significantly due to the increased uses of smartphones and mobiles devices, as well as increased data transmission from content-rich sources such as photo and video and related entertainment services. Network operators and wireless broadband operators have witnessed and increasing trend of having wireless data offloaded onto broadband/Wi-Fi networks. The introduction of new devices which increase the acceptance of wireless data transmission has further increased the acceptance of Wi-Fi usage. Further, increasing demand for high performance has continued, including with the introduction of many cloud-based services.

Many mobile device users subscribe to a Home Service Provider (HSP) which designates the nature of data usage on the HSP networks and hotspots. However, in some events the user may roam to a Wi-Fi hotspot network that is operated by another provider, known as a Visited Network Provider's (VNP) hotspot. Often, this is done voluntarily by the user to avoid data consumption on the HSP network, or it may occur automatically.

In most events, the event of roaming onto a VNP requires settlement between the HSP and the VNP. Wholesale settlement is the act of identifying the traffic, or user session(s), applying negotiated rates between the HSP and the VNP. In addition, financial settlement based upon the negotiated rates must occur, resulting in a series of payment and reporting obligations in order to reconcile the user sessions between the HSP and the VNP as their customers use each other's networks.

Remote Authentication Dial In User Service (RADIUS) is a networking protocol that provides centralized Authentication, Authorization, and Accounting (AAA) management for computers to connect and use a network service.

With the broad support and the ubiquitous nature of the RADIUS protocol, it is often used by ISPs and enterprises to manage access to the Internet or internal networks, wireless networks, and integrated e-mail services. These networks may incorporate modems, DSL, access points, VPNs, network ports, web servers, etc. RADIUS is a client/server protocol that runs in the application layer, using UDP as transport. The Remote Access Server, the Virtual Private Network server, the Network switch with port-based authentication, and the Network Access Server (NAS), are all gateways that control access to the network, and all have a RADIUS client component that communicates with the RADIUS server. RADIUS serves three functions: to authenticate users or devices before granting them access to a network; to authorize those users or devices for certain network services; and to account for usage of those services.

Servers such as RADIUS are utilized for remote user authentication and accounting. RADIUS is a server for remote user authentication and accounting. Its primary use is for Internet Service Providers, though it may as well be used on any network that needs a centralized authentication and/or accounting service for its workstations.

As discussed herein, settlement systems for data roaming activity includes the following: determining the HSP and VNP; obtaining the roaming usage information; applying the HSP and VNP information such as rates and settlement instructions; applying payable and receivables information; performing inbound billing and settlement; performing outbound payment and settlement; processing such payables and receivables; providing reports and reporting constructs; and performing dispute resolution (See FIG. 1).

The disclosed settlement systems involve VNPs implementing flexibility to charge different rates for different hotspots, or groups of hotspots, based on a variety of data associated with the user session.

In accordance with some embodiments, the disclosed systems and methods implement rating capabilities regarding network and/or wireless usage in near-real time. For example, as will be discussed in more detail below, sessions are rated as accounting stops are received from VPNs. Additionally, flexible rating options are based on specific settlement and clearing correlations occurring during wireless data roaming and offloading. Indeed, both inbound and outbound usage on a network and/or VPN is rated and such data is available for reporting and settlement. In accordance with exemplary embodiments of the present disclosure, rating scenarios include, but are not limited to, data usage, minutes of use, session time or identifier, domestic/international sessions, usage caps per user or network limit, session clusters, and the like.

According to the exemplary embodiments, the present disclosure utilizes groups of rules and conditions for rating for roaming contracts by obtaining configured groups of ratings rules, testing the rating rules in order of priority, confirming the session attributed generated from RADIUS packets, confirming the presence of VNP hotspot directory data, obtaining a match for rating rules, and applying the rating found. The presently disclosed systems and methods include rating scenarios including, but not limited to, location, time, minutes of use, data volume and incremental rating. The disclosed systems and methods provides and supports complex settlement agreements which require specific rounding and capping rules for billing between roaming partners.

In other embodiments, the present disclosure allows a VNP to negotiate roaming contracts and define different rates for different locations, as well as to provide the session data, including data usage, minutes of use, session, domestic/international, hotspot name, venue type, usage caps per user, session clusters, tiers, specificity rounding options for MOU and data calculations, specificity for currency calculations.

As discussed herein, as a message to offload from wide area to a local area network has been received, the location information of the mobile subscription is matched with available local area networks. It is done by using the information in a database, and one or more local area networks can be selected as candidates for data off-loading. In an advanced embodiment of the disclosure the contractual information is used in the selection. The contractual information sets the term of conditions for the wide area operator to use a particular local area network. It should be noted that the contract does not have to be directly between the wide area and the local area network operators but there can be a broker in between. When the contractual information is used a logical selection policy is cost minimization. In another advanced embodiment, an online auction mechanics can be applied to assist the selection process.

An HSP's subscriber base is allowed to roam onto a VNP's Wi-Fi network wherever there has been a negotiated roaming contract (a contract with a service provider, e.g., ISP including access providers, mailbox providers, hosting providers, transit providers, virtual ISPs, peering, intelligence assistance, and the like). The HSP and VNP will negotiate the terms of the contract (either directly, or through a third party), and they will agree upon certain rates and terms of usage. The ability to have more flexibility in assigning different rates to different hotspots allows a VNP to have more control over their roaming contracts, by allowing a VNP to assign premium rates to premium locations.

For example, each of a customer's roaming agreements is managed by their contracts and terms established with respect to inbound, outbound, and/or bilateral agreements. The present disclosure provides the functionality to manage many types of agreements between customers. Such capabilities and agreements include aggregator agreements, agreements between carriers using gateways/hubs, and/or direct agreements with carriers (or customers). Thus, as discussed herein, rating rules are established for inbound/outbound activities on the network(s)) in accordance with existing contracts (agreements).

In other embodiments, the present disclosure provides for VNP hotspot directory rules to be applied in the absence of specific VNP rating rules. String matching rules are setup against regular expressions for specific fields in a VNP's hotspot directory. If a session occurs at a hotspot whose directory information matches one of these groups of rules, then the corresponding rate is applied. In yet another embodiment, standard roaming rating applications in the absence of specific rating instructions and VNP hotspot directory rules.

In accordance with exemplary embodiments, the present disclosure will be described with reference to a wireless communication device capable of operating with a first access network and a second access network, with the first access network being a public WiFi network and the second access network being a Universal Mobile Telecommunications System (UMTS) network. It will however be appreciated that the present disclosure may apply to other types of networks and wireless communication devices capable of operating with any combination of two or more different networks, which may be selected from, for example: GSM; Enhanced Data rates for GSM Evolution (EDGE); General Packet Radio System (GPRS); CDMA, such as IS-95; WCDMA or Universal Mobile Telecommunications System (UMTS); Fourth Generation Long Term Evolution (LTE); other wide area network communication systems; Private Mobile Radio (PMR); Worldwide Interoperability for Microwave Access (WIMAX); WLAN; or the like, including any network for which the wireless communication device has credentials to access the network. By describing the disclosure with respect to UMTS and WiFi networks, it is not intended to limit the disclosure in any way.

The wireless communication device in accordance with the disclosure may be a portable or mobile telephone, a Personal Digital Assistant (PDA), a wireless video or multimedia device, a portable computer, an embedded communication processor or similar wireless communication device. In the following description, the communication device will be referred to generally as User Equipment (UE) for illustrative purposes and it is not intended to limit the disclosure to any particular type of communication device. Certain modern handheld electronic devices (UE) comprise the necessary components to connect to a cellular network, such as a 2G, 2.5G, 3G, and/or LTE network, and the necessary components to connect to a non-cellular IP Connectivity Access Network (IP CAN) such as a wireless LAN network (e.g. IEEE 802.11a/b/g/n) or a wired LAN network (e.g. IEEE 802.3).

As discussed above, it should be understood that second generation (2G) and third generation (3G or 3.5G) wide area networks are widely spread all over the world and provide varying capabilities for mobile applications in terms of bandwidth, coverage and latency. Typically these mobile networks provide data rates that are generally adequate for services employing a low to medium bandwidth applications such as voice communications, text messaging, instant messaging, e-mail with no or relatively small attachments. The data access rates tend to be marginal for services which demand or would otherwise benefit from a higher bandwidth such as multimedia streaming, rich content web browsing, or large file downloads. The greatest advantages of these networks are mobility and the wide area coverage except indoors. On the contrary wireless local area networks (WLAN) offer far better data rates and are today extensively deployed especially in metropolitan areas. The capabilities of mobile devices are growing fast and more advanced devices are consuming more bandwidth in the networks they operate. These devices, e.g., iPhone® as a prime example, but not limiting in nature, are equipped with both wide area connectivity and local area connectivity and applications such as web browsers and multimedia streaming applications. Thus, in line with the above discussion, the present disclosure acknowledges the challenges of such requirements of bandwidth set to wide area networks. Therefore, the present disclosure provides methods and systems for balancing the load off to local area networks with much greater bandwidth capacity.

Thus, in accordance with some embodiments, the present disclosure provides a way to "offload" certain data traffic from cellular access networks into a non-cellular IP Connectivity Access Network (CAN). This presents benefits to mobile network operators (MNO) and end users who utilize a user entity capable of operating both on the cellular net and on non-cellular IP CAN such as Wi-Fi. The cost per bit in the macro-cellular infrastructure is significantly higher than for the offloaded traffic. This is not only the case for the infrastructural investment cost, but also for operational expenses as location, power and even the fixed backhaul for Wi-Fi will typically not be borne by the MNO. Furthermore it allows the mobile operator to charge for this offloaded traffic, creating new revenue opportunities.

The preferred embodiments of the present disclosure will now be described where for completeness, reference should be made at least to FIGS. 1-13. As discussed herein, the present disclosure involves resource allocation and redirection of data traffic for flexible rating, settlement and clearing of wireless data roaming and offloading for purposes of financial settlement and reconciliation.

As discussed herein, the present disclosure implements the ability of data clearing and reporting. That is, the disclosed systems and methods have the ability to differentiate partners and networks routed either directly through a common network or through other hubs/aggregators. Such roaming relationships can be tracked at a variety of levels and via specific identifiers of entities and relationships. These levels include Corporate Client Name Abbreviation (CCNA), which is a unique identifier which identifies an individual company. Also, Account Level ID (ALID), which identifies relationships with a company. This identifier also may designate the service provider who owns the subscriber relationships, and/or the venue owner/aggregator who owns the location or hotspot. Such accounting structures also include Sub-Account Level IDs (SALID). This involves identifying and subdividing a subscriber or network footprint as defined by the customer (or contract/agreement) for reporting purposes. Thus, these features of the present disclosure enable the management, maintenance of complex reporting, rating and settlement for customers.

As discussed above, reporting plays a key role in the flex rating disclosure. Detailed reporting allows for roaming traffic to be accounted for using the correct set of rates, and it allows for detailed invoices to be produced. There are a variety of reporting options. However, these should not be construed to be limiting, as all known and to be known methods of reporting are viable options/alternatives/additions. Such reporting can include, but not limited to, predefined reports, session data, CDR delivery to partners, and reporting on a web portal, which includes summary reports, historical reports and download activity on the network(s) and among the users. The predefined reports can include, but are not limited to, a 24 hour delay, a mediated and summarized information report which occurs not at the RADIUS packet level, and date ranges, and the like. Session data reporting criteria occurs at near real-time, and provides the ability to drill down to RADIUS level information. CDR delivery provides EOM usage files will full detail of activity regarding usage and offloading and loading, and the like. Reports can include details of roaming activity, traffic usage analysis, for both inbound and outbound views, as well as activity relegated to a specific time period.

The preferred embodiments of the disclosure facilitate methods for performing data off-load from one wireless communication system to another wireless communication system using at least two different communication protocols. Handsets preferentially use Wi-Fi networks for data transfer when the handset is connected to a Wi-Fi network. Off-load occurs whenever a user connects to a Wi-Fi network. This can be a connection manually initiated by a user, or one that is automatically initiated by software on the Wi-Fi enabled device. The wireless communication systems may be any type of present or future developed wireless communication systems, but not limited to UMTS, High-Speed Packet Access (HSPA), Global System for Mobile Communications (GSM), General Packet Radio Services (GPRS), Code Division Multiple Access 2000 (CDMA2000), and IEEE 802.11 based WLAN systems.

For the purposes of explanation simplicity the example embodiments is described with reference to a 3G system and a WLAN communication system that provides a network, or a hot spot, within the coverage of 3G system. However, as aforementioned, the descriptions of the preferred embodiments of the disclosure also apply to other wireless communication systems as well. The operators benefiting from CM include all wide area network operators such as 3G cellular network operators.

Financial clearing and settlement, as disclosed herein, handles reconciliation of roaming records and settlement of financial accounts between customers and roaming partners (e.g., network advocates and the like). The disclosed financial clearing includes receiving and sending invoices, reconciliation, bank account management, follow-up payment, settlement of accounts, book keeping, and other services which are vital to providing the roaming services discussed herein.

Figure 13:
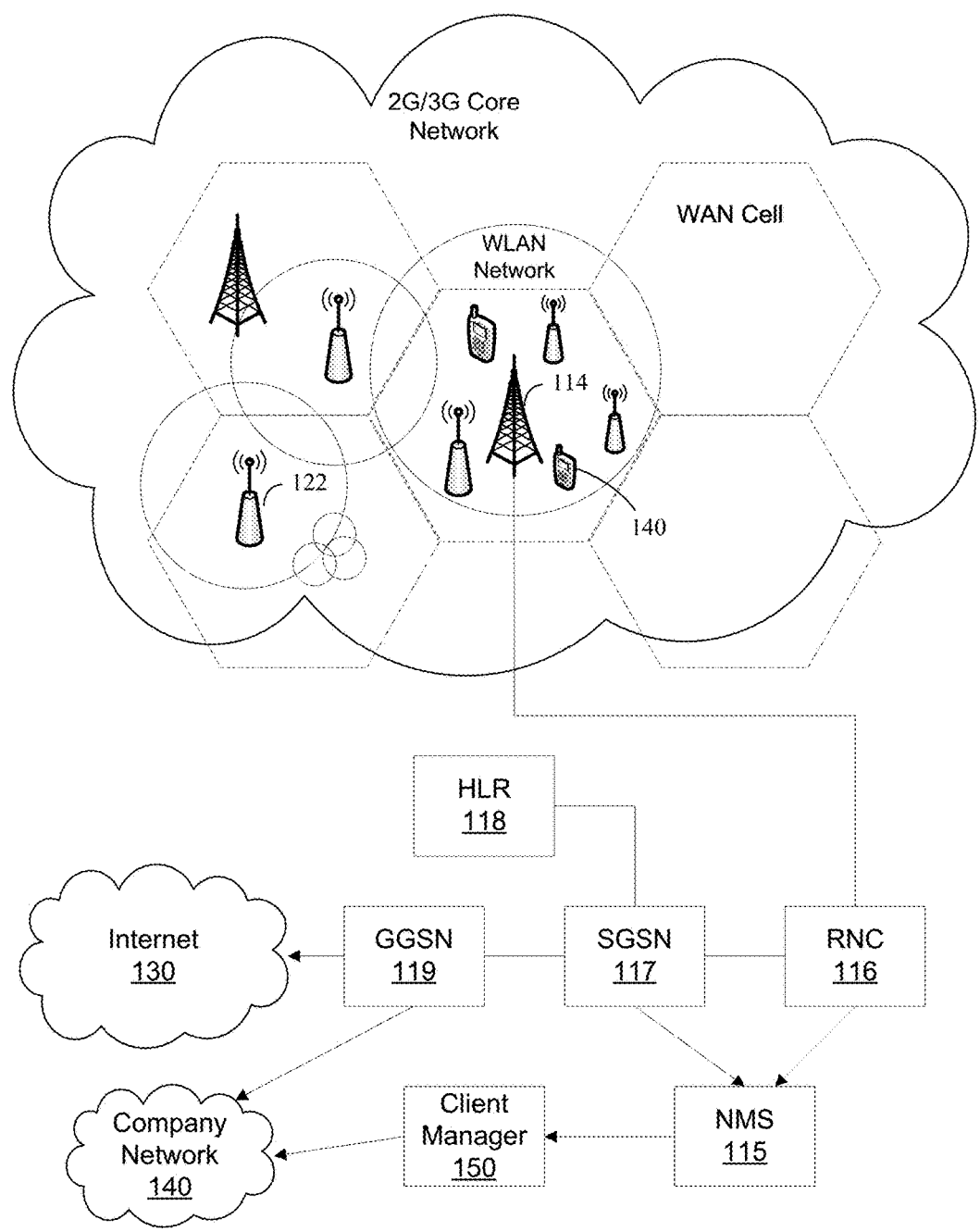
FIG. 13 depicts a block diagram showing elements of a wireless wide area network and location area communication system in accordance with embodiments of the present disclosure.

Turning to FIG. 13, FIG. 1 is a wireless communication system 100 in accordance with at least one embodiment of the present disclosure. The system 100 comprises of two or more communication systems having overlapping coverage area and having at least two communications protocols. FIG. 1 presents a 3G system 110 and a WLAN system 120 where the 3G system has a wider coverage compared to a WLAN system within the 3G coverage area. The 3G system is composed of plurality of cells 112, each of which is served by a base station 114. Further, the 3G system comprises network elements RNC 116, SGSN 117, HLR 118, and GGSN 119 to connect to the Internet 130. Network Management System (NMS) 115 interfaces with the Client Manager 150 to provide Core Network 110 originated information. The WLAN system 120 comprises access points (AP) 122 that serve the clients 140 using the WLAN system 120. FIG. 1 also presents the problem where base station 114 serving multiple clients 140 may result in congestion where the data throughput of clients 140 drops to an unacceptable level. In most cases the area covered by the cell 112 also have WLAN networks 120. The WLAN system 120 may be managed by the operator of the 3G system 110 or by some other operator of similar 3G or other wide area wireless system, or private individuals.

Furthermore, those skilled in art will recognize that the FIG. 13 does not depict all the necessary network devices and equipment necessary for system 100 to operate fully but only those system blocks and logical entities particularly relevant to the description of the preferred embodiments of the disclosure. Those skilled in art are aware of the many ways the necessary components can be implemented.

EXAMPLE

Example 1

The systems depicted in FIGS. 1-13 can involve roaming/overlapping (e.g., geographically) networks. It should be understood by those of skill in the art and from the discussion herein that network overlap within the realm of data clearing and reporting includes location directory management, data file management and reporting tools. The disclosed systems and methods include advanced filtering tools for adding latitude and longitude information (geocoding) when necessary to identify a particular network and activity, and/or identify and settle overlapping and/or roaming. As discussed above, and applied below, each network depicted may be equipped with separate authentication, authorization and accounting (AAA) servers. For example, in exemplary embodiments, each AAA server may be a RADIUS server.

Figure 7:
FIG. 7 shows an example of matching rating rules against RADIUS attributes as set forth in Example 1.

Consider an example VNP, "Fly-Fi", whose footprint is comprised of only airports, as shown in FIG. 7. Fly-Fi may want to charge a higher rate for larger international (Intl) airports, a discount rate for smaller Regional airports, and apply special rates for specific airports. Fly-Fi may also desire different pricing for domestic vs. foreign locations.

Figure 8:
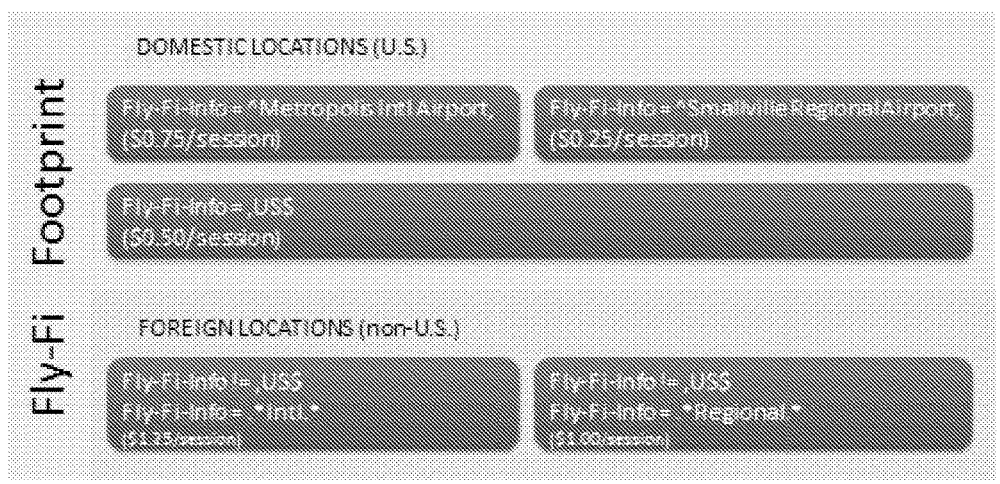
FIG. 8 shows groupings by the present disclosure of regular expressions to be setup as rules to check for each session, as set forth in Example 1.

The present disclosure allows for groupings of regular expressions to be setup as rules to check for each session, as shown in FIG. 8. Every VNP likely has its own way of conveying this type of information. For example, Fly-Fi sends a comma-separated RADIUS attribute named Fly-Fi-Info in this format:

Fly-Fi-Info=<Venue Name>,<Venue City>,<Venue Country>.

Figure 9:
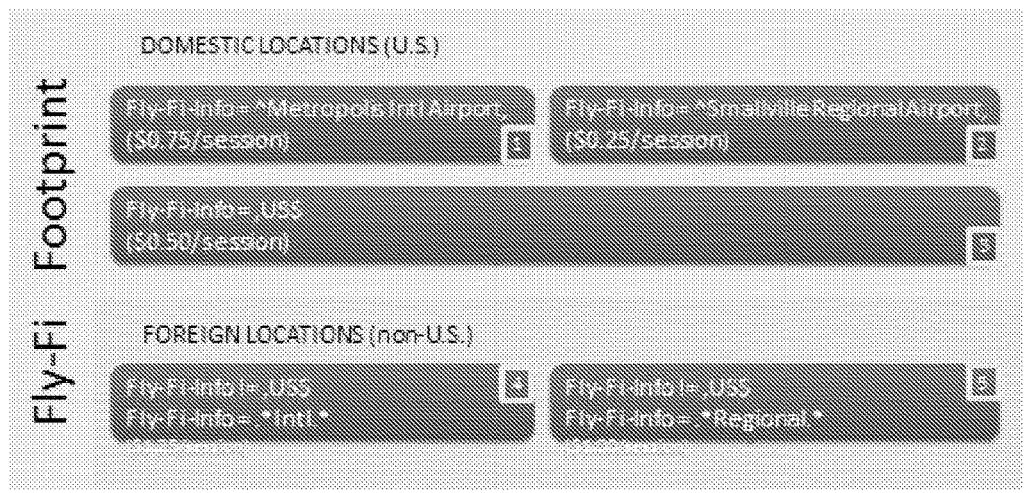
FIG. 9 shows each grouping of conditions is linked in Example 1 to the rate to be applied when all conditions are met, and also assigned a priority, to define what order to check these groups of rules.

Each grouping of conditions is linked to the rate to be applied when all conditions are met; see FIG. 9. Then each grouping is also assigned a priority, to define what order to check these groups of rules. In the example below, the priority helps prevent assigning the $0.50 default domestic rate to the 2 specifically-named airports, even though they are also domestic locations.

Figure 10:
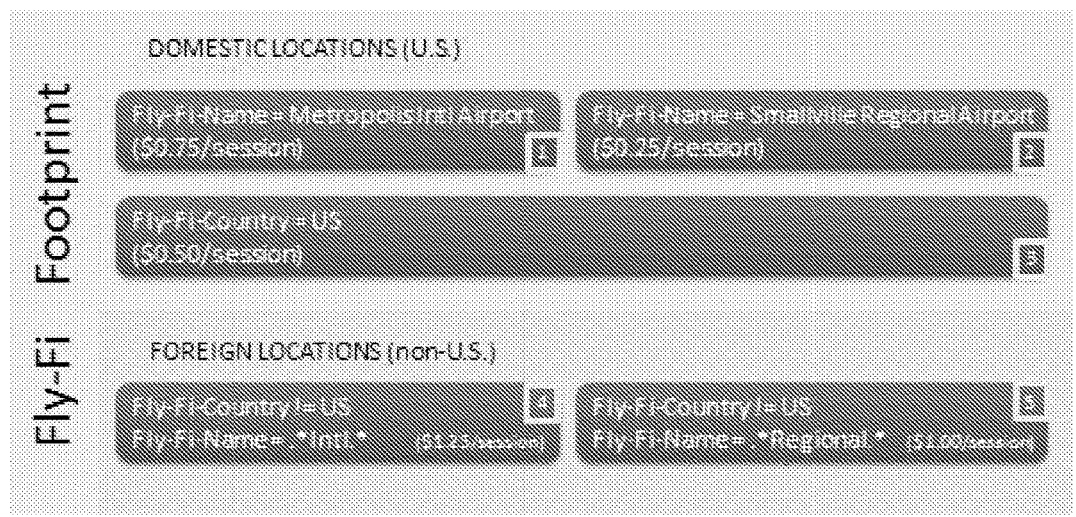
FIG. 10 depicts the present disclosure accommodating multiple rules and attributes as set forth in Example 1.

The present disclosure may then accommodate multiple rules and attributes. FIG. 10 shows how the rules are changed if Fly-Fi was configured to send their location data in 2 different RADIUS attributes instead:

Fly-Fi-Name=<Venue Name>
Fly-Fi-Country=<Venue Country>

Figure 11:
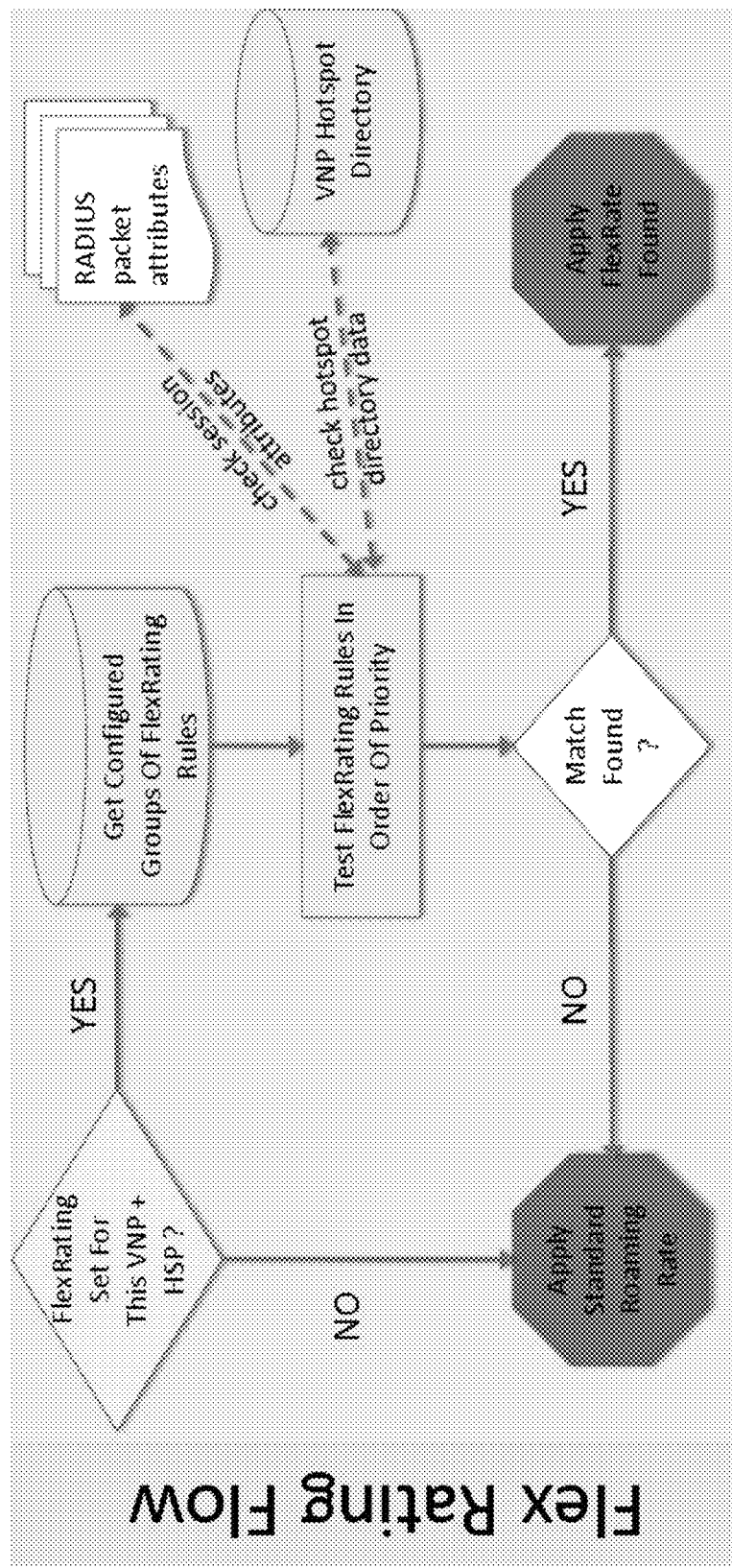
FIG. 11 shows how similar rules may be setup to attempt regular expression matches against the VNP's Hotspot Directory instead of RADIUS attributes. The next slide shows an example of matching against the Hotspot Directory.
Figure 12:
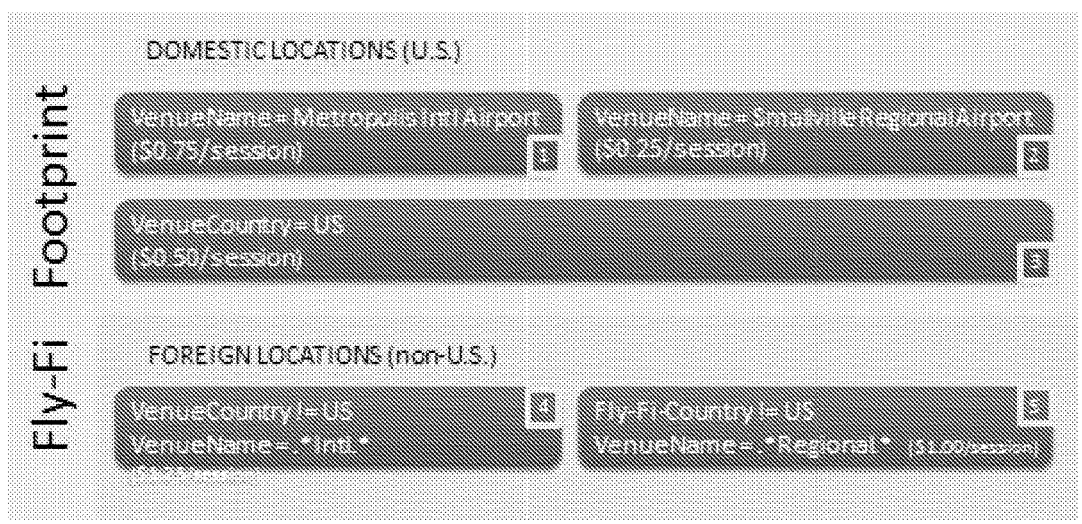
FIG. 12 shows, as set forth in Example 1, the present disclosure matching against the Hotspot Directory.

In addition, similar rules can be setup to attempt regular expression matches against the VNP's Hotspot Directory instead of RADIUS attributes, as shown in FIG. 11. A group of rating rules can also use a combination of the two. FIG. 12 shows an example of matching against the Hotspot Directory. When checking against the Hotspot Directory, the rule is tagged as a Directory rule (instead of a RADIUS attribute rule). The regular expression rule is then matched against a Hotspot Directory entry instead of a RADIUS attribute.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   determining, via a computing device, session information associated with a user device in accordance with a first network;
   determining, via the computing device, roaming session information associated with the user device in accordance with a second network, said roaming session information based upon information associated with a roaming session at the second network;
   performing settlement, via the computing device, between the first network and the second network based in part upon said session information and said roaming session information, said settlement comprising negotiating rates between the first network and said second network, said settlement further comprising:
      confirming a rating rule based upon said negotiated rate between the first network and said second network and said session information and said roaming session information generated in association with said user device;
   negotiating, via the computing device, usage contracts between the first network and said second network;
   selecting, based upon offload criteria, said confirmed rating rule, wherein said confirmed rating rule facilitating cost minimization for network usage of the second network by said user device; and
   wherein the selection of said confirmed rating rule, causes the user device to offload from said first network to said second network and said offloading comprising applying the selected confirmed rating rule to network activity of said user device.

2. The method of claim 1, further comprising:
   determining a presence of a third network based upon information associated with the user device, said information comprising at least one of a location of the user device or network activity of the user device on said first network or said second network; and
   determining roaming session information associated with the user device in accordance with a third network, said roaming session information based upon information associated with a roaming session at the third network.

3. The method of claim 2, further comprising:
offloading, via the computing device, the user device from said second network to said third network based upon settlement between the first network and said third network, which comprises confirming a second rating rule for application to the user device's network activity based in part upon network configuration and data usage associated with said third network; and applying the second rating rule to network activity of said user device.

4. The method of claim 1, wherein said first network is a network provided by a home service provider (HSP).

5. The method of claim 1, wherein said second network is a network provided by a Virtual Network Provider (VNP) at a VNP hotspot.

6. The method of claim 1, wherein said rating rule confirmation is based in part upon session packet information generated from RADIUS packets, wherein said confirmation comprises obtaining said group of ratings rules in accordance with said RADIUS packets and matching each rating rule in accordance with said roaming session information associated with said second network.

7. The method of claim 1, wherein each the roaming session information comprises at least one of the group consisting of: user device location, time usage of said second network, minutes of use, data volume and an incremental rating.

8. The method of claim 1, wherein said negotiation of usage contracts is further based upon at least one of a group consisting of: aggregator agreements for network usage, agreements between service providers and direct agreements with a user associated with the user device.

9. The method of claim 1, wherein said applied rating is adjusted in accordance with network usage by the user device and contractual information between the user device and second network.

10. The method of claim 1 wherein, said negotiation comprising:
identifying rates attributable to the user device upon activity occurring over the first network;
identifying rates attributable to the user device upon activity occurring over the second network; and
comparing each respective rate in accordance with offload criteria associated with said second network, said offload criteria based upon contractual information between the user device and the second network.

11. A non-transitory computer-readable storage medium tangibly encoded with computer-executable instructions, that when executed by a processor, perform a method comprising:
determining session information associated with a user device in accordance with a first network;
determining roaming session information associated with the user device in accordance with a second network, said roaming session information based upon information associated with a roaming session at the second network;
performing settlement between the first network and the second network based in part upon said session information and said roaming session information, said settlement comprising negotiating rates between the first network and said second network; and
confirming a rating rule based upon said negotiated rate between the first network and said second network and said session information and said roaming session information generated in association with said user device;

negotiating usage contracts between the first network and said second network; and
selecting, based upon offload criteria, said confirmed rating rule, wherein said confirmed rating rule facilitating cost minimization for network usage of the second network by said user device; and
wherein the selection of said confirmed rating rule causes the user device, to offload from said first network to said second network and said offloading comprising applying the selected confirmed rating rule to network activity of said user device.

12. The non-transitory computer-readable storage medium of claim 11, further comprising:
determining a presence of a third network based upon information associated with the user device, said information comprising at least one of a location of the user device or network activity of the user device on said first network or said second network; and
determining roaming session information associated with the user device in accordance with a third network, said roaming session information based upon information associated with a roaming session at the third network.

13. The non-transitory computer-readable storage medium of claim 12, further comprising:
offloading, via the computing device, the user device from said second network to said third network based upon settlement between the first network and said third network, which comprises confirming a second rating rule for application to the user device's network activity based in part upon network configuration and data usage associated with said third network; and
applying the second rating rule to network activity of said user device.

14. The non-transitory computer-readable storage medium of claim 11, wherein said rating rule confirmation is based in part upon session packet information generated from RADIUS packets, wherein said confirmation comprises obtaining said group of ratings rules in accordance with said RADIUS packets and matching each rating rule in accordance with said roaming session information associated with said second network.

15. The non-transitory computer-readable storage medium of claim 11, wherein, said negotiation comprising:
identifying rates attributable to the user device upon activity occurring over the first network;
identifying rates attributable to the user device upon activity occurring over the second network; and
comparing each respective rate in accordance with offload criteria associated with said second network, said offload criteria based upon contractual information between the user device and the second network.

16. A system comprising:
at least one computing device comprising:
memory storing computer-executable instructions; and
one or more processors for executing said computer-executable instructions, comprising:
determining session information associated with a user device in accordance with a first network;
determining roaming session information associated with the user device in accordance with a second network, said roaming session information based upon information associated with a roaming session at the second network;
performing settlement between the first network and the second network based in part upon said session information and said roaming session information, said settlement comprising negotiating rates between the first network and said second network; and confirming a rating rule based upon said negotiated rate between the first network and said second network and said session information and said roaming session information generated in association with said user device;

negotiating usage contracts between the first network and said second network; and logically selecting, based upon offload criteria, said confirmed rating rule, wherein said confirmed rating rule facilitating cost minimization for network usage of the second network by said user device; and wherein the selection of said confirmed rating rule causes the user device, based on the compared rates, to offload from said first network to said second network and said offloading comprising applying the selected confirmed rating rule to network activity of said user device.

17. The system of claim 16, wherein said computer-executable instructions, further comprising:

determining a presence of a third network based upon information associated with the user device, said information comprising at least one of a location of the user device or network activity of the user device on said first network or said second network;

determining roaming session information associated with the user device in accordance with a third network, said roaming session information based upon information associated with a roaming session at the third network;

offloading, via the computing device, the user device from said second network to said third network based upon settlement between the first network and said third network, which comprises confirming a second rating rule for application to the user device's network activity based in part upon network configuration and data usage associated with said third network; and applying the second rating rule to network activity of said user device.

18. The system of claim 16, wherein said negotiation comprising:

identifying rates attributable to the user device upon activity occurring over the first network;

identifying rates attributable to the user device upon activity occurring over the second network; and comparing each respective rate in accordance with offload criteria associated with said second network, said offload criteria based upon contractual information between the user device and the second network.

\* \* \* \* \*